United States Patent
DeNicola, Jr. et al.

(10) Patent No.: US 6,319,976 B1
(45) Date of Patent: Nov. 20, 2001

(54) POLYOLEFIN GRAFT COPOLYMER/ POLYMIDE BLEND

(75) Inventors: Anthony J. DeNicola, Jr., Newark; Tam T. M. Phan, Bear, both of DE (US)

(73) Assignee: Montell Property Company BV (NL)

( * ) Notice: Subject to any disclaimer, the term of this patent is extended or adjusted under 35 U.S.C. 154(b) by 0 days.

(21) Appl. No.: 09/640,945

(22) Filed: Aug. 17, 2000

Related U.S. Application Data

(62) Division of application No. 09/213,583, filed on Dec. 17, 1998, now abandoned.

(51) Int. Cl.[7] .................................................. C08L 77/00
(52) U.S. Cl. ........................... 524/504; 523/212; 524/492; 524/493; 524/495; 525/66; 525/92 B; 525/101
(58) Field of Search ..................... 525/66, 92 B, 525/101; 524/504, 492, 493, 495; 523/212

(56) References Cited

U.S. PATENT DOCUMENTS

| | | | |
|---|---|---|---|
| 4,593,066 | 6/1986 | Dean ........................ | 525/66 |
| 4,837,264 | 6/1989 | Zahradnik et al. ............ | 524/381 |
| 5,021,510 | 6/1991 | Vroomans ................. | 525/285 |
| 5,180,788 | 1/1993 | Vroomans ................. | 525/285 |
| 5,229,456 | 7/1993 | Ilenda et al. ............... | 525/66 |
| 5,234,993 | 8/1993 | Huynh-Ba ................. | 525/66 |
| 5,244,971 | 9/1993 | Jean-Marc ................. | 525/64 |
| 5,278,231 | 1/1994 | Chundury .................. | 525/66 |
| 5,290,856 | 3/1994 | Okamoto et al. ............ | 525/64 |
| 5,312,867 * | 5/1994 | Mitsuno et al. ............. | 525/66 |
| 5,317,059 | 5/1994 | Chundury et al. ........... | 525/64 |
| 5,663,229 | 9/1997 | Presenz et al. .............. | 524/399 |
| 5,665,820 | 9/1997 | Leistner et al. ............. | 525/66 |
| 5,965,666 | 10/1999 | Koo et al. ................. | 525/66 |

FOREIGN PATENT DOCUMENTS

| | | |
|---|---|---|
| 286734 | 10/1988 | (EP) . |
| 745647 | 12/1996 | (EP) . |
| 60170665 | 9/1985 | (JP) . |
| 9415981 | 7/1994 | (WO) . |

OTHER PUBLICATIONS

Kuphal, J. A. et al., "Miscible Blends of Styrene–Acrylic Acid Copolymers with Aliphatic, Crystalline Polyamides," J. Appl. Polym. Sci., 1525–1535, vol. 42 (1991).

Jo, W. H. et al., "Morphology, Rheological and Mechanical Properties of Poly (phenylene ether) and Polyamide–6 Blends With A Compatibilizer," Polymer Bulletin, 27, 465–471 (1992).

* cited by examiner

*Primary Examiner*—Ana Woodward

(57) ABSTRACT

A polymer blend containing (1) about 1% to about 98% of a graft copolymer comprising a backbone of a propylene polymer material having graft polymerized thereto monomers selected from (a) at least one vinyl aromatic compound and an unsaturated carboxylic acid and b) at least one vinyl aromatic compound and an anhydride of an unsaturated acid or its acid form, wherein the polymerized monomers are present in an amount of about 10 to about 95 parts per hundred parts of the propylene polymer material, (2) about 99% to about 2% of at least one polyamide resin, and (3) about 5% to about 90% of a broad molecular weight distribution propylene polymer material. The composition optionally also contains about 2% to about 30% of one or more rubber components, and an additive to improve the scratch and mar resistance of the composition.

9 Claims, No Drawings

POLYOLEFIN GRAFT COPOLYMER/POLYMIDE BLEND

CROSS REFERENCE TO RELATED APPLICATIONS

This application is a division of application Ser. No. 09/213,583, filed on Dec. 17, 1998, now abandoned, the entire contents of which are incorporated herein by reference.

FIELD OF THE INVENTION

This invention relates to compositions comprising a polyamide resin, a broad molecular weight distribution propylene polymer material, and a graft copolymer of a propylene polymer material.

BACKGROUND OF THE INVENTION

Blends of two or more polymers have often been made, for example in attempts to combine desirable properties of the individual polymers into the blend, to seek unique properties in the blend, or to produce less costly polymer products by including less expensive polymers in the blend. Many attempts have been made to blend polyamide resins, such as nylon-6 and nylon-6,6, and polyolefin materials. Polyamide resins have excellent chemical and abrasion resistance, good oxygen barrier properties, good electrical properties, and superior mechanical strength, but are very moisture sensitive and are difficult to process due to their high melting temperature. Polypropylene is a low cost, low density semi-crystalline polymer with excellent moisture resistance that is capable of being recycled and is easy to process.

However, it is difficult to obtain a good dispersion of a polar polyamide resin and a nonpolar polyolefin resin. It is known that the addition of a graft or block copolymer of similar chemical structure to the blend components can improve the quality of the dispersion. These copolymer additives, generally referred to as compatibilizers, are often added to the blend as a third component.

Maleic anhydride-grafted polypropylene has been used as a compatiliblizer for polypropylene/nylon blends. For example, a graft copolymer that is the reaction product of a styrene/maleic anhydride copolymer and a functionalized thermoplastic polymer, such as polypropylene grafted with carboxylic acid-containing monomers, is added to a polyamide and, optionally, polypropylene, as disclosed in U.S. Pat. No. 5,244,971. The styrene copolymer can be based on styrene and/or alpha-methylstyrene and maleic anhydride and optionally an acrylate or methacrylate and/or acrylonitrile. U.S. Pat. No. 5,317,059 discloses a polymer composition comprising (1) at least one olefin polymer, (2) at least one polyamide, (3) a compatibilizing agent that is at least one terpolymer of an alpha-olefin, an acrylic ester, and an unsaturated dicarboxylic acid reagent or a glycidyl acrylate, and optionally (4) an auxilliary compatibilizing agent. U.S. Pat. No. 5,665,820 discloses the use of an elastomeric polypropylene modified with an unsaturated grafting monomer and/or blends thereof with isotactic polypropylene modified with an unsaturated grafting monomer as a compatibilizer for a blend of a polyamide and a polyolefin. The grafting monomers used include unsaturated mono-or dicarboxylic acids or anhydrides or esters thereof, esters of vinyl alcohol, vinyl aromatic compounds, and mixtures thereof. U.S. Pat. No. 5,234,993 discloses a blend of at least one polyamide and a crystalline polyolefin containing a compatibilizing rubbery polymer such as an ethylene/propylene/diene rubber grafted with at least one of maleic anhydride and glycidyl methacrylate.

However, there is still a need for a material that will produce a homogeneous polyamide/polyolefin blend with improved impact resistance and an improved balance of strength and stiffness.

SUMMARY OF THE INVENTION

The composition of this invention comprises, by weight,
(1) about 1% to about 98% of a graft copolymer comprising a backbone of a propylene polymer material having graft polymerized thereto monomers selected from the group consisting of (a) at least one vinyl aromatic compound and an unsaturated carboxylic acid and (b) at least one vinyl aromatic compound and an anhydride of an unsaturated carboxylic acid or its acid form, wherein the polymerized monomers are present in an amount of about 10 to about 95 parts per hundred parts of the propylene polymer material, and
(2) about 99% to about 2% of at least one polyamide resin
"(3) about 5% to about 90% of a broad molecular weight distribution propylene polymer material having a weight average molecular weight to number average molecular weight ratio of about 5 to about 60;
(4) optionally, about 2% to about 30% of at least one rubber component selected from the group consisting of (i) an olefin copolymer rubber, (ii) a monoalkenyl aromatic hydrocarbon-conjugated diene block copolymer, and (iii) a core-shell rubber; and
(5) optionally, an additive to improve the scratch and mar resistance of the composition selected from the group consisting of (a) about 0.5% to about 10% of at least one low molecular weight ethylene polymer of a functionalized derivative thereof, having a number average molecular weight of about 300 to about 5000, and (b) a combination of about 0.5% to about 10% of at least one of the low molecular weight ethylene polymers in (a) and about 0.5% to about 10% of inorganic microspheres."

Blends of the graft copolymer and a polyamide are compatible, are easy to process, and have good moisture barrier properties. Articles produced from these blends have good impact resistance and a good balance of strength and stiffness.

DETAILED DESCRIPTION OF THE INVENTION

The amount of graft copolymer in the composition of this invention is about 1% to about 98%, preferably about 50% to about 90%, based on the total weight of the composition.

The propylene polymer material that is used as the backbone of the graft copolymer can be:
(1) a homopolymer of propylene having an isotactic index greater than 80, preferably about 85 to about 99;
(2) a copolymer of propylene and an olefin selected from the group consisting of ethylene and 4–10 C alpha-olefins, provided that when the olefin is ethylene, the maximum polymerized ethylene content is about 10%, preferably about 4%, and when the olefin is a 4–10 C alpha-olefin, the maximum polymerized content thereof is about 20% by weight, preferably about 16%, the copolymer having an isotactic index greater than 85;
(3) a terpolymer of propylene and two olefins selected from the group consisting of ethylene and 4–8 C alpha-olefins, provided that the maximum polymerized 4–8 C alpha-olefin content is 20% by weight, preferably about 16%, and, when ethylene is one of the olefins, the maximum polymerized ethylene content is 5% by weight, preferably about 4%, the terpolymer having an isotactic index greater than 85;

(4) an olefin polymer composition comprising:
  (a) about 10% to about 60% by weight, preferably about 15% to about 55%, of a propylene homopolymer having an isotactic index greater than 80, preferably about 85 to about 98, or a copolymer of monomers selected from the group consisting of (i) propylene and ethylene, (ii) propylene, ethylene and a 4–8 C alpha-olefin, and (iii) propylene and a 4–8 C alpha-olefin, the copolymer having a polymerized propylene content of more than 85% by weight, preferably about 90% to about 99%, and an isotactic index greater than 85;
  (b) about 5% to about 25% by weight, preferably about 5% to about 20%, of a copolymer of ethylene and propylene or a 4–8 C alpha-olefin that is insoluble in xylene at ambient temperature; and
  (c) about 30% to about 70% by weight, preferably about 40% to about 65%, of an elastomeric copolymer of monomers selected from the group consisting of (i) ethylene and propylene, (ii) ethylene, propylene, and a 4–8 C alpha-olefin, and (iii) ethylene and a 4–8 C alpha-olefin, the copolymer optionally containing about 0.5% to about 10% by weight of a polymerized diene and containing less than 70% by weight, preferably about 10% to about 60%, most preferably about 12% to about 55%, of polymerized ethylene and being soluble in xylene at ambient temperature and having an intrinsic viscosity, measured in tetrahydronaphthalene at 135° C., of about 1.5 to about 4.0 dl/g,
wherein the total amount of (b) and (c), based on the total olefin polymer composition, is about 50% to about 90%, the weight ratio of (b)/(c) is less than 0.4, preferably 0.1 to 0.3, and the composition is prepared by polymerization in at least two stages and has a flexural modulus of less than 150 MPa; or (5) a thermoplastic olefin comprising:
  (a) about 10% to about 60%, preferably about 20% to about 50%, of a propylene homopolymer having an isotactic index greater than 80, or a copolymer of monomers selected from the group consisting of (i) ethylene and propylene, (ii) ethylene, propylene and a 4–8 C alpha-olefin, and (iii) ethylene and a 4–8 C alpha-olefin, the copolymer having a polymerized propylene content greater than 85% and an isotactic index of greater than 85;
  (b) about 20% to about 60%, preferably about 30% to about 50%, of an amorphous copolymer of monomers selected from the group consisting of
    (i) ethylene and propylene, (ii) ethylene, propylene, and a 4–8 C alpha-olefin, and (iii) ethylene and a 4–8 C alpha-olefin, the copolymer optionally containing about 0.5% to about 10% of a polymerized diene, and containing less than 70% polymerized ethylene and being soluble in xylene at ambient temperature; and
  (c) about 3% to about 40%, preferably about 10% to about 20%, of a copolymer of ethylene and propylene or a 4–8 C alpha-olefin that is insoluble in xylene at ambient temperature,
wherein the thermoplastic olefin has a flexural modulus of greater than 150 but m less than 1200 MPa, preferably about 200 to about 1100 MPa, and most preferably about 200 to about 1000 MPa Room or ambient temperature is ~25° C.

The 4–8 C alpha-olefins useful in the preparation of (4) and (5) include, for example, butene-1, pentene-1; hexene-1; 4-methyl-1-pentene, and octene-1.

The diene, when present, is typically a butadiene; 1,4-hexadiene; 1,5-hexadiene, or ethylidenenorbornene.

Propylene polymer materials (4) and (5) can be prepared by polymerization in at least two stages, where in the first stage the propylene; propylene and ethylene; propylene and an alpha-olefin, or propylene, ethylene and an alpha-olefin are polymerized to form component (a) of (4) or (5), and in the following stages the mixtures of ethylene and propylene; ethylene and the alpha-olefin, or ethylene, propylene and the alpha-olefin, and optionally a diene, are polymerized to form components (b) and (c) of (4) or (5).

The polymerization can be conducted in liquid phase, gas phase, or liquid-gas phase using separate reactors, all of which can be done either by batch or continuously. For example, it is possible to carry out the polymerization of component (a) using liquid propylene as a diluent, and the polymerization of components (b) and (c) in gas phase, without intermediate stages except for the partial degassing of the propylene. All gas phase is the preferred method.

The preparation of propylene polymer material (4) is described in more detail in U.S. Pat. Nos. 5,212,246 and 5,409,992, which are incorporated herein by reference. The preparation of propylene polymer material (5) is described in more detail in U.S. Pat. Nos. 5,302,454 and 5,409,992, which are incorporated herein by reference.

Propylene homopolymer is the preferred propylene polymer backbone material.

The monomers that can be grafted onto the backbone of propylene polymer material are either (i) at least one vinyl aromatic compound and an unsaturated carboxylic acid or (ii) at least one vinyl aromatic compound and an anhydride of an unsaturated carboxylic acid or its acid form. During the graft polymerization, the monomers also copolymerize to form a certain amount of free or ungrafted copolymer or terpolymer. The polymerized monomers comprise about 10 to about 95 parts per hundred parts of the propylene polymer material, preferably about 30 to about 95 pph. The morphology of the graft copolymer is such that the propylene polymer material is the continuous or matrix phase, and the polymerized monomers, both grafted and ungrafted, are a dispersed phase.

The vinyl aromatic compounds can be substituted or unsubstituted and include, for example, styrene, α-methylstyrene, 4-butylstyrene, 4-tert-butylstyrene, 2-ethylstyrene, 2-methoxystyrene, 4-methoxystyrene, vinylnaphthalene, or any halogenated styrene such as 2-chlorostyrene and 4-chlorostyrene. Suitable unsaturated carboxylic acids include, for example, acrylic acid, methacrylic acid, and maleic acid. Suitable anhydrides of unsaturated carboxylic acids include, for example, maleic anhydride, acrylic anhydride, citraconic anhydride, and itaconic anhydride.

Preferred monomers include (i) styrene and methacrylic acid (S/MAA), (ii) styrene and maleic anhydride (S/MA), and (iii) styrene, alpha-methylstyrene, and maleic anhydride (S/MS/MA). In the case of S/MAA, the methacrylic acid comprises about 10% to about 90%, preferably about 10% to about 50%, of the total weight of the monomers. In the case of S/MS/MA, the styrene comprises about 5% to about 20%, the alpha-methylstyrene comprises about 5% to about 45%, and the maleic anhydride comprises about 5% to about 45%, based on the total weight of the monomers. In the case of S/MA, the maleic anhydride comprises about 35% to about 45%, preferably about 37% to about 43%, based on the total weight of the monomers.

The grafted copolymer chains act as a compatibilizer for the polypropylene and the polyamide phases.

The graft copolymer can be made according to any one of various methods. One of these methods involves forming active grafting sites on the propylene polymer material by treatment with a peroxide or other chemical compound that is a free radical polymerization initiator, or by irradiation with high energy ionizing radiation. The free radicals produced on the polymer as a result of the chemical or irradiation treatment form the active grafting sites on the polymer and initiate the polymerization of the monomers at these sites. Graft copolymers produced by peroxide-initiated grafting methods are preferred.

Preparation of graft copolymers by contacting the polypropylene with a free radical polymerization initiator such as an organic peroxide, and at least one vinyl monomer is described in more detail in U.S. Pat. No. 5,140,074, which is incorporated herein by reference. Preparation of graft copolymers by irradiating an olefin polymer and then treating with at least one vinyl monomer is described in more detail in U.S. Pat. No. 5,411,994, which is incorporated herein by reference.

Component (2) of the composition of this invention is at least one polyamide. Suitable polyamides are well known and widely available. Basically they can be obtained by polymerizing a monoamino-monocarboxylic acid or a lactam thereof having at least two carbon atoms between the amine and carboxylic acid group, or by polymerizing substantially equimolecular proportions of a diamine that contains at least two carbon atoms between the amine groups and a dicarboxylic acid; or by polymerizing a monoaminocarboxylic acid or a lactam thereof as defined above together with substantially equimolecular proportions of a diamine and dicarboxylic acid. The dicarboxylic acid may be used in the form of a functional derivative thereof, for example, an ester or acid chloride.

The term "substantially equimolecular" proportions (of the diamine and of the dicarboxylic acid) is used to cover both strict equimolecular proportions and slight departures therefrom that are involved in conventional techniques for stabilizing the viscosity of the resultant polyamides.

Examples of the monoamino-monocarboxylic acids or lactams thereof that are useful in preparing the polyamides include those compounds containing from 2 to 16 carbon atoms between the amino and carboxylic acid groups, the carbon atoms forming a ring with the —CO—NH— group in the case of a lactam. Particular examples of aminocarboxylic acids and lactams include, for example, 6-aminocaproic acid, butyrolactam, pivalolactam, caprolactam, capryllactam, enantholactam, undecanolactam, dodecanolactam, and 3- and 4-aminobenzoic acids.

Diamines suitable for use in the preparation of the polyamides include alkyl, aryl and alkyl-aryl diamines. Such diamines include, for example, those represented by the general formula:

where n is an integer from 2 to 16, such as trimethylenediamine, tetramethylenediamine, pentamethylenediamine, octamethylenediamine and especially hexamethylenediamine, as well as trimethylhexamethylenediamine, meta-phenylenediamine, and metaxylylenediamine.

The dicarboxylic acids can be aromatic, for example, isophthalic and terephthalic acids, or aliphatic, wherein the aliphatic dicarboxylic acids are of the formula:

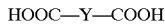

where Y represents a divalent aliphatic group containing at least 2 carbon atoms. Examples of such acids are sebacic acid, octadecanedioic acid, suberic acid, glutaric acid, pimelic acid and adipic acid. Typical examples of the polyamides or nylons, as these are often called, include, for example:

polypyrrolidone (nylon 4)
polycaprolactam (nylon 6)
polycapryllactam (nylon 8)
polyhexamethylene adipamide (nylon 6, 6)
polyundecanolactam (nylon 11)
polydodecanolactam (nylon 12)
polyhexamethylene azelaiamide (nylon 6, 9)
polyhexamethylene sebacamide (nylon 6, 10)
polyhexamethylene isophthalamide (nylon 6, I)
polyhexamethylene terephthalamide (nylon 6, T)
polyamide of hexamethylenediamine and n-dodecanedioic acid (nylon 6, 12) as well as polyamides resulting from terephthalic acid and/or isophthalic acid and trimethylhexamethylenediamine, polyamides resulting from adipic acid and metaxylenediamines, polyamides resulting from adipic acid, azelaic acid and 2,2-bis(p-aminocyclohexyl) propane and polyamides resulting from terephthalic acid and 4,4'-diaminodicyclohexylmethane.

Copolymers of the foregoing polyamides or prepolymers thereof are also suitable for use in the practice of the present invention.

Such copolyamides include copolymers of the following:
hexamethylene adipamide/caprolactam (nylon 6, 6/6)
hexamethylene adipamide/hexamethylene isophthalamide (nylon 6, 6/6, I)
hexamethylene adipamide/hexamethylene terephthalamide (nylon 6, 6/6, T)
hexamethylene adipamide/hexamethylene azelaiamide (nylon 6, 6/6, 9)
hexamethylene adipamide/hexamethylene azelaiamide/caprolactam (nylon 6, 6/6, 9/6)

Mixtures and/or copolymers of two or more of the foregoing polyamides or prepolymers thereof, respectively, are also within the scope of the present invention. Especially preferred polyamides are the polyamides 6; 6,6; 11; 12 and mixtures of at least one crystalline polyamide, e.g., 6; 6,6, and at least one amorphous polyamide, e.g., 6, I; 6, I,T; and most preferably polyamide 6, polyamide 11, or polyamide 12.

It is also understood that the use of the term "polyamides" here and in the appended claims is intended to include the toughened or supertough polyamides. Supertough polyamides, or supertough nylons, as they are more commonly known, are available commercially, e.g., from E. I. du Pont de Nemours and Company (Zytel ST resins), Wilson Fiberfille (NY resins), Badische Aniline and Sodafabrik (Ultramid resins), among others, or may be prepared in accordance with a number of U.S. patents including, among others, U.S. Pat. Nos. 4,174,358; 4,474,927; 4,346,194 and 4,251,644, which are incorporated herein by reference. These supertough nylons are prepared by blending one or more polyamides with one or more polymeric or copolymeric elastomeric toughening agents. Suitable toughening agents are disclosed in the U.S. patents identified above as well as in U.S. Pat. Nos. 3,884,882 and 4,147,740, and Galucci et al, "Preparation and Reactions of Epoxy-Modified Polyethylene," J. Appl. Poly. Sci., 27, 425–437 (1982), which are incorporated herein by reference. Typically, these elastomeric polymers and copolymers can be straight chain or branched as well as graft polymers and copolymers, including core-shell graft copolymers, and are characterized as having incorporated therein either by copolymerization or by grafting on the preformed polymer, a monomer having functional and/or active or highly polar groupings capable of interacting with or adhering to the polyamide matrix so as to enhance the toughness of the polyamide polymer.

The polyamide is present in an-amount of about 99% to about 2%, preferably about 50% to about 10%, based on the total weight of the composition.

Optionally, the composition can also contain about 2% to about 40%, preferably about 5% to about 30%, based on the total weight of the composition, of one or more rubber components, and/or about 5% to about 90%, preferably about 10% to about 70%, based on the total weight of the composition, of a broad molecular weight distribution propylene polymer material.

The rubber component is selected from one or more of the group consisting of (i) an olefin copolymer rubber, (ii) a monoalkenyl aromatic hydrocarbon-conjugated diene block copolymer, and (iii) a core-shell rubber. Any of these rubber components can have acid or anhydride functionality or can be free of these functional groups. The preferred rubber components are (i) or (ii), either alone or in combination.

Suitable olefin copolymer rubbers include, for example, saturated olefin copolymer rubbers such as ethylene/propylene monomer rubbers (EPM), ethylene/octene-1, and ethylene/butene-1 rubbers, and unsaturated olefin copolymer rubbers such as ethylene/propylene/diene monomer rubbers (EPDM). The preferred olefin copolymer rubbers are ethylene/propylene, ethylene/butene-1, and ethylene/octene-1 copolymers.

The monoalkenyl aromatic hydrocarbon-conjugated diene block copolymer can be a thermoplastic elastomer of the A-B (or diblock) structure, the linear A-B-A (or triblock) structure, the radial (A-B)$_n$ type where n=3–20%, or a combination of these structure types, wherein each A block is a monoalkenyl aromatic hydrocarbon polymer block, and each B block is an unsaturated rubber block. Various grades of copolymers of this type are commercially available. The grades differ in structure, molecular weight of the mid and end blocks, and the ratio of monoalkenyl aromatic hydrocarbon to rubber. The block copolymer can also be hydrogenated. Typical monoalkenyl aromatic hydrocarbon monomers are styrene, ring-substituted 1–4 C linear or branched alkyl styrenes, and vinyltoluene. Styrene is preferred. Suitable conjugated dienes include, for example, butadiene and isoprene. Preferred block copolymers are hydrogenated styrene/ethylene-butene-1/styrene triblock copolymers.

The weight average molecular weight ($M_w$) of the block copolymers generally will be in the range of about 45,000 to about 260,000 g/mole, average molecular weights in the range of about 50,000 to about 125,000 g/mole being preferred on the basis that they produce compositions having the best balance of impact strength and stiffness. Also, while block copolymers having unsaturated as well as saturated rubber blocks can be used, copolymers having saturated rubber blocks are preferred, also on the basis of the impact/stiffness balance of the compositions containing them. The weight ratio of monoalkenyl aromatic hydrocarbon to conjugated diene rubber in the block copolymer is in the range of about 5/95 to about 50/50, preferably about 10/90 to about 40/60.

The core-shell rubber components comprise small particles of a crosslinked rubber phase surrounded by a compatibilizing shell, normally a glassy polymer or copolymer. The core is typically a diene rubber such as butadiene or isoprene rubber, or a polyacrylate. The shell is typically a polymer of two or more monomers selected from styrene, methyl methacrylate, and acrylonitrile. Particularly preferred core-shell rubbers have a polyacrylate core.

Suitable rubbers useful as impact modifiers include, for example, Engage 8150 ethylene/octene-1 copolymer commercially available from DuPont-Dow Elastomers; EPM 306P ethylene/propylene copolymer, commercially available from the Polysar Rubber Division of Miles, Incorporated; and Kraton RP6912 styrene/ethylene-propylene/styrene triblock copolymer rubber and Kraton FG1901X styrene/ethylene-butene-1/styrene triblock copolymer rubber modified with maleic anhydride, commercially available from Shell Chemical Company.

Preferred rubbers are (1) maleic anhdride-modified monoalkenyl aromatic hydrocarbon-conjugated diene block copolymers, (2) a combination of a maleic anhydride-modified monoalkenyl aromatic hydrocarbon-conjugated diene block copolymer and an unmodified monoalkenyl aromatic hydrocarbon-conjugated diene block copolymer, (3) a combination of a maleic anhydride-modified monoalkenyl aromatic hydrocarbon-conjugated diene block copolymer and an olefin copolymer rubber, or (4) a combination of a maleic anhydride-modified monoalkenyl aromatic hydrocarbon-conjugated diene block copolymer, an unmodified monoalkenyl aromatic hydrocarbon-conjugated diene block copolymer, and an olefin copolymer rubber.

Another ingredient is a broad molecular weight distribution propylene polymer material (BMWD PP) having a $M_w/M_n$ of about 5 to about 60, preferably about 5 to about 40; a melt flow rate of about 0.5 to about 50, preferably about 1 to about 30 g/10 min, and xylene insolubles at 25° C. of greater than or equal to 94%, preferably greater than or equal to 96%, and most preferably greater than or equal to 98%. The propylene polymer material having a broad molecular weight distribution can be a homopolymer of propylene or an ethylene/propylene rubber impact-modified homopolymer of propylene, wherein the propylene homopolymer has a broad molecular weight distribution.

The BMWD PP can be prepared by sequential polymerization in at least two stages, in the presence of a Ziegler-Natta catalyst supported on magnesium halide in active form. The polymerization process occurs in separate and consecutive stages, and in each stage polymerization takes place in the presence of the polymer and the catalyst from the preceding stage.

The polymerization process can be carried out in a batch or in a continuous mode according to known techniques, operating in liquid phase in the presence or not of an inert diluent, or in gas phase, or liquid-gas phase, preferably in gas phase. The preparation of the BMWD PP is described in more detail in U.S. Pat. No. 5,286,791, which is incorporated herein by reference.

The composition of this invention can also contain (a) an inorganic filler such as $CaCO_3$, talc, or a silicate, (b) a glass fiber reinforcing agent, or (c) a mixture of (a) and (b). If present, the amount of (a) and/or (b) is about 5% to about 50%, preferably about 10% to about 30%, based on the total weight of the composition.

A coupling agent is generally used with the glass fibers. The coupling agent can be, for example, polypropylene modified with an α, β-unsaturated carboxylic acid or an alicyclic carboxylic acid and derivatives thereof, such as acrylic acid, methacrylic acid, maleic acid, fumaric acid, itaconic acid, endocyclo(2,2,1)-5-heptene-2,3-carboxylic acid and cis-4cyclohexene-1,2-carboxylic acid and anhydrides, esters, amides, and imides thereof. Polypropylenes modified with various amounts of maleic anhydride or maleic acid are preferred and are available commercially, for example, from Eastman Chemical Company and Aristech Chemicals. The modified polypropylenes generally contain about 0.5% to about 10% of maleic acid or maleic anhydride, based on the total weight of the modified polymer. The coupling agent is used in an amount of about 0.5% to about 7%, preferably about 1% to about 5%, based on the total weight of the composition.

The composition can also optionally contain about 1% to about 10%, preferably about 2% to about 5%, based on the total weight of the composition, of a co-compatibilizing agent when glass fibers are not present. Suitable co-compatibilizing agents include the modified propylene polymers described above under coupling agents.

Optionally the composition can also contain an additive to improve scratch and mar resistance. The additive is selected from (a) at least one low molecular weight ethylene polymer or a functionalized derivative thereof, and (b) a combination of at least one of the low molecular weight ethylene polymers in (a) and inorganic microspheres.

The low molecular weight ethylene polymer has a number average molecular weight ($M_n$) of about 300 to about 5000. Functionalized derivatives of these ethylene polymers, such as the hydroxylated or ethoxylated derivatives or phosphate esters thereof, or primary carboxylic acid derivatives or maleic acid-grafted linear ethylene polymers, can also be used. The ethylene polymer is present in an amount of 0.5% to about 10%, preferably about 2% to about 5%, based on the total weight of the composition.

The additive can also be a combination of about 0.5% to about 10% of the low molecular weight ethylene polymer described above and about 0.5% to about 10%, preferably about 1% to about 5%, based on the total weight of the composition, of inorganic microspheres. The inorganic microspheres can be, for example, a silica-alumina ceramic alloy, alkali aluminosilicate ceramic, or glass and can be coated with a sizing agent such as an aminosilane. A modified polypropylene such as those described under coupling agents can also be used in conjunction with the inorganic microspheres and acts as a coupling agent and co-compatibilizer.

Other additives such as pigments, slip agents, waxes, oils, antiblocking agents, antioxidants, and polysiloxanes such as poly(dimethylsiloxane) can also be present in the composition.

Articles of manufacture can be formed from the compositions of this invention by methods known in the art including, for example, injection molding, thermoforming, profile extrusion, sheet extrusion, and blow molding.

The test methods used to evaluate the molded specimens were:

| | |
|---|---|
| Notched Izod impact | ASTM D-256 (2 lb pendulum) |
| Tensile strength at yield | ASTM D-638-89 (cross-head speed @ 2"/min) |
| Flexural strength at yield | ASTM D-790 @ 0.05"/min |
| Flexural modulus (1% secant) | ASTM D-790 @ 0.05"/min |
| Elongation at break | ASTM D-638-89 |
| Elongation at yield | ASTM D-638-89 |
| Shore D hardness | ASTM D-2240 |
| Heat distortion temperature | ASTM D-648 |
| Tensile modulus | ASTM D-638-89 (cross-head speed @ 2"/min) |

Isotactic index is defined as the % insoluble in xylene. The weight percent of olefin polymer soluble in xylene at room temperature is determined by dissolving 2.5 g of the polymer in 250 ml of xylene at room temperature in a vessel equipped with a stirrer, that is heated at 135° C. with agitation for 20 minutes. The solution is cooled to 25° C. while continuing the agitation, and then left to stand without agitation for 30 minutes so that the solids can settle. The solids are filtered with filter paper, the remaining solution is evaporated by treating it with a nitrogen stream, and the solid residue is vacuum dried at 80° C. until a constant weight is reached. The percent by weight of polymer insoluble in xylene at room temperature is the isotactic index of the polymer. The value obtained in this manner corresponds substantially to the isotactic index determined via extraction with boiling n-heptane, which by definition constitutes the isotactic index of the polymer.

Intrinsic viscosity is measured in tetrahydronaphthalene at 135° C.

The porosity of the propylene homopolymer used as the backbone polymer in the manufacture of the graft copolymers in the examples is measured as described in Winslow, N. M. and Shapiro, J. J., "An Instrument for the Measurement of Pore-Size Distribution by Mercury Penetration," ASTM Bull., TP 49, 39–44 (Feb. 1959), and Rootare, H. M., Eds., *Advanced Experimental Techniques in Powder Metallurgy*, Plenum Press, New York, 1970.

Scratch and mar resistance were measured using Ford Laboratory Test Method BN 108-13 (resistance to scratching). The apparatus included several weighted pins that rested on the surface of the test specimen. The pins used for the scratch test were 1.0 mm highly polished steel balls and the pins used for the mar test were 7.0 mm balls. The pins were loaded with different weights exerting the following standard forces on the surface of the test material: 2.0 Newtons (N); 3.0 N; 4.5 N; 6.0 N; 7.0 N. The pins were then pulled along the panel. All scratch lines were examined and rated according to a rating scale of 1 to 5, with 1=no scratch line at all and 5=severe scratching. Improvement relative to the control was the criteria for acceptable results. A black pigmented test specimen was used because experience indicated that scratching was easier to see with the naked eye on a black surface than on surfaces of other colors.

All gloss readings were taken with a 20 degree gloss meter from a smooth (ungrained) sample.

The Chrysler crocking gloss test was carried out according to Chrysler laboratory procedure LP463PB-54-01 using an Atlas AATCC Mar Tester, Model CM-5. Dry Bon-Ami cleanser was applied to half of a 4"×6" molded plaque. The cylindrical acrylic finger on the Mar Tester was covered with a 2"×2" piece of 14-9956-000 green felt, commercially available from Atlas Electric Devices Co. The cleanser-coated plaque was rubbed with the wool felt ten times (ten double strokes). The 20° gloss was measured at several places on the marred and unmarred areas of the plaque. The maximum gloss value on the unmarred area is referred to as the original gloss. The minimum gloss of the marred area is referred to as the marred gloss. % Gloss retention, or mar resistance, is the marred gloss divided by the original gloss×100.

The Ford crocking gloss test was carried out according to Ford laboratory test method B1 161-01, Mar Resistance Determination for Automotive Coatings, using an Atlas AATCC Mar Tester, Model CM-5. A 50 mm×50 mm square of 281 Q Wetordry Production Polishing Paper, commercially available from Minnesota Mining and Manufacturing Company (3 µm grade rather than the 2 µm standard grade), was placed over a similar size square of 14-9956-000 green felt commercially available from Atlas Electric Devices Co., with the abrasive side of the polishing paper facing outward. The two squares were mounted over the finger of the mar tester, keeping the felt between the finger and the polishing paper. The mar tester had a cylindrical acrylic, brass or wooden finger 16 mm in diameter and exerted a force of 9 N on the test surface and had a stroke of approximately 100 mm. After the 20° gloss of the surface to be tested was measured, the surface was subjected to 10 double strokes of the mar tester. The 20° gloss of the abraded area was measured in a direction parallel to the rubbing stroke of the mar tester, and the lowest reading was recorded. The % gloss retention, or mar resistance, is the 20° gloss of the abraded area divided by the original 20° gloss×100.

In this specification, all parts and percentages are by weight unless otherwise noted.

EXAMPLE 1

This example describes the effect of nylon-6 and an impact modifier on the properties of a graft copolymer comprising a propylene homopolymer backbone to which was grafted a styrene/methacrylic acid copolymer (PP-g-(S/MAA)). A comparison was also made with a composition containing a maleic anhydride-grafted polypropylene compatibilizer, but no PP-g-(S/MAA) graft copolymer.

In this and the following examples the propylene homopolymer used as the backbone polymer had the following properties: spherical form, melt flow rate (MFR) of 10 dg/min at 230° C. and 2160 g, 0.44 cc/g porosity, 96.5% insoluble in xylene at room temperature, $M_w/M_n$=5.

The monomers (60/40 styrene/methacrylic acid) were grafted onto the polypropylene backbone at a grafting temperature of 100° C. using the previously described peroxide-initiated graft polymerization process. Ninety-five parts by weight monomers were added per 100 parts of polypropylene. Tert-butylperoxy- 2-ethylhexanoate (2.1 parts of active peroxide per hundred parts of the polypropylene backbone polymer, 50% in mineral spirits) was used as the peroxide initiator. The styrene and methacrylic acid were premixed and fed at 1.0 pph/min for 95 minutes. A monomer to initiator (M/I) ratio of 100/1 was used. After addition of monomers was complete, the reaction conditions were maintained at 100° C. for an additional 30 minutes and the temperature was then raised to 140° C. for 90 minutes under a nitrogen purge.

The graft copolymer was then blended with the materials listed in Table 1. All polymers were used without drying, with the exception of the polyamide, which was dried in a desiccant drying oven at 175° F. (80° C.) overnight or at least 3 hours prior to blending. All materials were simultaneously dry-blended and bag mixed with 0.2 wt. % Irganox B225 antioxidant and 0.1 wt % calcium stearate before extrusion. The amount of each material is given in Table 1.

The broad molecular weight distribution polypropylene (BMWD PP) had a melt flow rate (MFR) of 1.1 dg/min, 97.8% xylene insolubles, and $M_w/M_n$>6, and is commercially available from Montell USA Inc. Enough BMWD PP was added to each sample to adjust the effective add level of polymerized monomer to 30 parts per hundred parts of polypropylene.

The polyamide was Capron 8202 NL polycaprolactam, commercially available from AlliedSignal Inc. The polyamide had a melt flow index of 34.2 (3.8 kg, 230° C.).

The propylene homopolymer in Comparative Example 3 was the same as the one used as the backbone polymer for the graft copolymer.

The S-EB-S-g-MA impact modifier was Kraton PG1901X styrene/ethylene-butylene/styrene maleic anhydride-grafted triblock copolymer containing ~2 wt. % maleic anhydride and commercially available from Shell Chemical Company.

The maleated polypropylene (PP) compatibilizer was Unite MP1000 polypropylene, commercially available from Aristech Chemical Corporation.

Irganox B225 antioxidant is a blend of 1 part Irganox 1010 tetrakis[methylene(3,5-di-tert-butyl-4hydroxyhydrocinnamate)]methane stabilizer and 1 part Irgafos 168 tri(2,4-di-t-butylphenyl)phosphite stabilizer, and is commercially available from Ciba Specialty Chemicals Corporation.

The samples were compounded on a 34 mm Leistritz twin screw extruder at a barrel temperature of 245° C., a screw speed of 300 rpm, and a throughput rate of 25 lb/hr. After extrusion, the pellets were dried in a desiccant drier at 175° F. for at least 2–4 hours prior to molding.

Injection molded test bars were molded on a 5 oz Battenfeld injection molding machine. Mechanical properties were measured after conditioning for 48 hours at 50% relative humidity and 23° C. The results are given in Table 1.

TABLE 1

| Sample | 1 | 2 | 3 | Comp. 1 | Comp. 2 | Comp. 3 |
|---|---|---|---|---|---|---|
| PP-g-(S/MAA) (wt. %) | 38 | 33 | 31 | 48 | 43 | — |
| BMWD PP (wt. %) | 42 | 37 | 34 | 52 | 47 | 34 |
| Propylene homopolymer (wt. %) | — | — | — | — | — | 31 |
| S-EB-S-g-MA (wt. %) | — | 10 | 10 | — | 10 | 10 |
| Polyamide (wt. %) | 20 | 20 | 25 | — | — | 20 |
| Antioxidant (pph) | 0.2 | 0.2 | 0.2 | 0.2 | 0.2 | 0.2 |
| Ca stearate (pph) | 0.1 | 0.1 | 0.1 | 0.1 | 0.1 | 0.1 |
| Maleated PP (wt. %) | — | — | — | — | — | 5 |
| Notched Izod impact (ft. lb/in) | 0.72 | 2.2 | 1.9 | 0.52 | 0.9 | 3.7 |

TABLE 1-continued

| Sample | 1 | 2 | 3 | Comp. 1 | Comp. 2 | Comp. 3 |
|---|---|---|---|---|---|---|
| Tensile strength @ yield (psi) | 7856 | 6190 | 6710 | 5707 | 5128 | 4705 |
| Flexural strength @ yield (psi) | 11130 | 8840 | 9390 | 8907 | 7149 | 5183 |
| Flexural modulus, 1% secant (kpsi) | 330 | 262 | 273 | 312 | 243 | 168 |
| Elongation @ break (%) | 4 | 29 | 24 | 6.5 | 42.5 | 85 |
| Elongation @ yield (%) | 4 | 5 | 4.4 | 4.6 | 7 | 9.6 |

The data show an increase in tensile strength and a good balance of impact strength and stiffness in the samples that contain a polyamide and a polypropylene-S/MAA graft copolymer. The compatibility of the blend is indicated by its stable morphology, high gloss, and good surface appearance.

EXAMPLE 2

This example describes the effect of nylon-6 and an impact modifier on the properties of a graft copolymer comprising a propylene homopolymer backbone to which was grafted a styrene/alpha-methylstyrene/maleic anhydride copolymer (S/MS/MA). A comparison was also made with a composition containing a maleic anhydride-grafted polypropylene compatibilizer, but no PP-g-(S/MS/MA) graft copolymer.

The monomers (19.4% styrene, 44% alpha-methylstyrene, 36.5% maleic anhydride) were grafted onto the polypropylene backbone at a grafting temperature of 90° C. using the previously described peroxide-initiated graft polymerization process. Ninety-five parts by weight monomers were added per 100 parts of polypropylene. Tertbutylperoxy pivalate (1.5 pph active peroxide, 75% in mineral spirits) was used as the peroxide. The monomers were fed at 1 ppr/min for 95 minutes. The maleic anhydride was melted and also fed at 1 ppb/min for 95 minutes. A monomer to initiator (M/I ratio of 100:1 was used. After the addition of monomers was complete, the reaction conditions were maintained at 90° C. for 30 minutes and the temperature was then raised to 140° C. for 30 minutes without nitrogen. Finally, the polymer was dried at 140° C. for 180 minutes under a nitrogen purge.

The graft copolymer was then blended with the materials listed in Table 2 as described in Example 1.

The BMWD PP, the propylene homopolymer, the polyamide, the impact modifier, the maleated polypropylene, and the antioxidant were the same as in Example 1.

The samples were compounded, the pellets were dried after extrusion, and injection molded test bars were molded as described in Example 1. The results of the mechanical property measurements are given in Table 2.

TABLE 2

| Sample | 1 | 2 | 3 | Comp. 1 | Comp. 2 | Comp. 3 |
|---|---|---|---|---|---|---|
| PP-g-(S/MS/MA) (wt. %) | 38 | 34 | 27 | 49 | 44 | — |
| BMWD PP (wt. %) | 42 | 36 | 28 | 51 | 46 | 34 |
| Propylene homopolymer (wt. %) | — | — | — | — | — | 31 |
| S-EB-S-g-MA (wt. %) | — | 10 | 15 | — | 10 | 10 |
| Polyamide (wt. %) | 20 | 20 | 30 | — | — | 20 |
| Antioxidant (pph) | 0.2 | 0.2 | 0.2 | 0.2 | 0.2 | 0.2 |
| Ca stearate (pph) | 0.1 | 0.1 | 0.1 | 0.1 | 0.1 | 0.1 |
| Maleated PP (wt. %) | — | — | — | — | — | 5 |
| Notched Izod impact (ft. lb/in) | 0.32 | 1.7 | 1.8 | 0.45 | 1.5 | 3.7 |
| Tensile strength @ yield (psi) | 5878 | 49990 | 5130 | 5450 | 4530 | 4705 |
| Flexural strength @ yield (psi) | 9174 | 7060 | 7050 | 7860 | 6370 | 5183 |
| Flexural modulus, 1% secant (kpsi) | 309 | 218 | 203 | 270 | 225 | 168 |
| Elongation @ break (%) | 4.3 | 33 | 28 | 10 | 26 | 85 |
| Elongation @ yield (%) | 3.9 | 6.14 | 5.2 | 5.3 | 5.6 | 9.6 |

The data show an increase in tensile strength and a good balance of impact strength and stiffness in the samples that contain a polyamide and a polypropylene-S/MS/MA graft copolymer.

EXAMPLE 3

This example describes the effect of the molar ratio of styrene/methacrylic acid (S/MAA) in the graft copolymer on the properties of the blend of the graft copolymer with a polyamide, a BMWD PP, and a rubber.

The graft copolymers were prepared as described in Example 1. The graft copolymers were then blended with the materials listed in Table 3 as described in Example 1.

The BMWD PP, the polyamide, the impact modifier, and the antioxidant were the same as in Example 1.

The samples were compounded, the pellets were dried after extrusion, and injection molded test bars were molded as described in Example 1. The results of the mechanical property measurements are given in Table 3. N.Y.=no yield.

TABLE 3

| Sample | 1 | 2 | 3 | 4 | 5 | 6 |
|---|---|---|---|---|---|---|
| Monomer molar ratio (S/MAA) | 80/20 | 70/30 | 60/40 | 50/50 | 40/60 | 20/80 |
| PP-g-(S/MAA) (wt. %) | 34 | 34 | 34 | 34 | 34 | 34 |
| BMWD PP (wt. %) | 36 | 36 | 36 | 36 | 36 | 36 |
| S-EB-S-g-MA (wt. %) | 10 | 10 | 10 | 10 | 10 | 10 |
| Polyamide (wt. %) | 20 | 20 | 20 | 20 | 20 | 20 |
| Antioxidant (pph) | 0.2 | 0.2 | 0.2 | 0.2 | 0.2 | 0.2 |
| Ca stearate (pph) | 0.1 | 0.1 | 0.1 | 0.1 | 0.1 | 0.1 |
| Notched Izod impact (ft. lb/in) | 2 | 1.7 | 2.2 | 0.9 | 0.4 | 0.4 |
| Tensile strength @ yield (psi) | 4200 | 5220 | 6190 | 6798 | 6050 | 5579 |
| Flex. modulus, 1% secant (kpsi) | 205 | 220 | 262 | 262 | 267 | 251 |
| Flex. strength @ yield (psi) | 6090 | 7150 | 8840 | 9131 | 9300 | 8193 |
| Elongation @ break (%) | 80 | 61 | 29 | 11.4 | 3.1 | 3.4 |
| Elongation @ yield (%) | 15 | 8.7 | 5 | 4.4 | N.Y. | N.Y. |

The data show that a molar ratio of 60/40 S/MAA gives the best balance of properties. Increasing the MAA content to above 50 mole % resulted in a brittle blend of graft copolymer and polyamide.

EXAMPLE 4

This example describes the effect of using different polyamides on the mechanical properties of a blend of a PP-g-(S/MAA) graft copolymer, a BMWD PP, and a rubber.

The graft copolymer was prepared as described in Example 1. The graft copolymer was then blended with the materials listed in Table 4 as described in Example 1. The BMWD PP, the rubber, and the antioxidant were described in Example 1.

The nylon 12 was NYMA4430 polyamide, commercially available from Elf Atochem. The nylon-11 was NYBESNOP40TL polyamide, commercially available ElP Atochem. The nylon 6,6 was Zytel 101 polyamide, commercially available from E. I. du Pont de Nemours & Co. The nylon 6/6,6 copolymer was Xtraform 1539F polyamide, commercially available from AlliedSignal, Inc. The impact-modified nylon-6 was Capron 8351 polyamide, commercially available from AlliedSignal, Inc.

The samples were compounded, the pellets were dried after extrusion, and injection molded test bars were molded as described in Example 1. The results of the mechanical property measurements are given in Table 4. All of the blends exhibited good compatibility and good processability.

TABLE 4

| Sample | 1 | 2 | 3 | 4 | 5 |
|---|---|---|---|---|---|
| PP-g-(S/MAA) (wt. %) | 31 | 31 | 31 | 31 | 31 |
| BMWD PP (wt. %) | 34 | 34 | 34 | 34 | 34 |
| S-EB-S-ga-MA (2% MA) (wt. %) | 10 | 10 | 10 | 10 | 10 |
| Nylon-12 (wt. %) | 25 | — | — | — | — |
| Nylon-11 (wt. %) | — | 25 | — | — | — |
| Nylon-6,6 (wt. %) | — | — | 25 | — | — |
| Nylon-6/6,6 copolymer (wt. %) | — | — | — | 25 | — |
| Impact-modified nylon-6 (wt. %) | — | — | — | — | 25 |
| Antioxidant (pph) | 0.2 | 0.2 | 0.2 | 0.2 | 0.2 |
| Ca stearate (pph) | 0.1 | 0.1 | 0.1 | 0.1 | 0.1 |
| Notched Izod impact (ft. lb/in) | 4.4 | 2.1 | 1.8 | 2 | 1.9 |
| Tensile strength @ yield (psi) | 5314 | 5944 | 3608 | 3708 | 4957 |
| Flexural strength @ yield (psi) | 6850 | 7507 | 5769 | 5468 | 6360 |
| Flexural modulus (kpsi) | 204 | 231 | 177 | 162 | 195 |
| Elongation @ break (%) | 100 | 45 | 50 | 79 | 52 |
| Elongation @ yield (%) | 5.6 | 6 | 3.4 | 4 | 9 |

In all cases the blends exhibited a good balance of properties and good processability.

EXAMPLE 5

This example describes the effect of varying the amount of impact modifier on the mechanical properties of a blend of a PP-g-(S/MAA) graft copolymer and a polyamide.

The graft copolymer was prepared as described in Example 1. The graft copolymer was then blended with the materials listed in Table 5 as described in Example 1.

The BMWD PP, the polyamide, the impact modifier, and the antioxidant were the same as in Example 1.

The samples were compounded, the pellets were dried after extrusion, and injection molded test bars were molded as described in Example 1. The results of the mechanical property measurements are given in Table 5.

TABLE 5

| Sample | 1 | 2 | 3 | 4 |
|---|---|---|---|---|
| PP-g-(S/MAA) (wt. %) | 32.5 | 31 | 30.5 | 29 |
| BMWPP (wt. %) | 35 | 34 | 32 | 31 |
| S-EB-S-g-MA (wt. %) | 2.5 | 5 | 7.5 | 10 |
| Polyamide (wt. %) | 30 | 30 | 30 | 30 |
| Antioxidant (pph) | 0.2 | 0.2 | 0.2 | 0.2 |
| Ca stearate (pph) | 0.1 | 0.1 | 0.1 | 0.1 |
| Notched Izod impact (ft. lb/in) | 0.9 | 1 | 1 | 1.5 |
| Tensile strength @ yield (psi) | 7630 | 7000 | 6738 | 6254 |
| Flex. modulus, 1% secant (kpsi) | 300 | 275 | 262 | 231 |
| Flex. strength @ yield (psi) | 10390 | 9300 | 9037 | 8050 |
| Elongation @ break (%) | 15 | 14 | 24 | 30 |
| Elongation @ yield (%) | 4.6 | 4.3 | 4.7 | 5.4 |

The data show that the impact resistance improves with the addition of an impact modifier, but tensile strength and modulus are reduced.

EXAMPLE 6

This example describes the effect of using different combinations of maleated and non-maleated rubbers on the mechanical properties of a blend of a PP-g-(S/MAA) graft copolymer and a polyamide.

The graft copolymer was prepared as described in Example 1. The graft copolymer was then blended with the materials listed in Table 6 as described in Example 1.

The BMWD PP, the polyamide, and the antioxidant were the same as in Example 1.

The S-EB-S-g-MA rubber was the same as described in Example 1. The SEBS rubber was Kraton G1652 styrene-ethylene/butylene-styrene triblock copolymer having a styrene/rubber ratio of 29/71 and is commercially available from Shell Chemical Company. The ethylene-octene rubber was Engage 8100 ethylene-octene metallocene rubber, commercially available from DuPont Dow Elastomers.

The samples were compounded, the pellets were dried after extrusion, and injection molded test bars were molded as described in Example 1. The results of the mechanical property measurements are given in Table 6.

graft copolymers, a BMWD PP, a rubber, and a polyamide, compared with the-polyamide alone.

The graft copolymer was prepared as described in Example 1. The graft copolymer was then blended with the materials listed in Table 7 as described in Example 1.

The BMWD PP, the polyamide, the impact modifier, and the antioxidant were the same as in Example 1.

The samples were compounded, the pellets were dried after extrusion, and injection molded test bars were molded as described in Example 1. The results of the mechanical property measurements are given in Table 7. In Table 7, DAM=dried-as-molded and water conditioned means tested after 7 days of water immersion at 23° C.

TABLE 7

| | Sample | | | | | |
|---|---|---|---|---|---|---|
| | 1 DAM | 2 Water Conditioned | 3 DAM | 4 Water Conditioned | 5 DAM | 6 Water Conditioned |
| PP-g-(S/MAA) (wt. %) | 32.5 | 32.5 | 34 | 34 | — | — |
| BMWD PP (wt. %) | 35 | 35 | 36 | 36 | — | — |
| S-EB-S-g-MA (wt. %) | 2.5 | 2.5 | 10 | 10 | — | — |
| Polyamide (wt. %) | 30 | 30 | 20 | 20 | 100 | 100 |
| Antioxidant (pph) | 0.2 | 0.2 | 0.2 | 0.2 | — | — |
| Ca stearate (pph) | 0.1 | 0.1 | 0.1 | 0.1 | — | — |
| Notched Izod impact (ft. lb/in) | 0.9 | — | 1.7 | — | 1.4 | — |
| Tensile strength @ yield (psi) | 7742 | 7102 | 5880 | 5462 | 11360 | 5890 |
| Tensile modulus (kpsi) | 340 | 330 | 280 | 270 | 427 | 217 |
| Flexural modulus (kpsi) | 316 | — | 265 | — | 400 | — |
| Elongation @ break (%) | 7.5 | 9.0 | 70 | 55 | 88 | 283 |
| Elongation @ yield (%) | 4.3 | 4.1 | 6.1 | 6.6 | 4.2 | 22 |
| Shore D hardness | 65 | — | 60 | — | 72 | — |
| HDT, ⅛" flex bar, 264 psi (° C.) | 58 | — | 56 | — | 56 | — |
| Water absorption, 7 days at 23° C. (wt. %) | — | 0.41 | — | 0.32 | — | 4.1 |

The data show that the PP-g-(S/MAA)/polyamide blends absorb very little moisture, the mechanical properties do not degrade in the presence of moisture, and the flexural modulus is better than that of water-conditioned polyamide.

TABLE 6

| Sample | 1 | 2 | 3 | 4 |
|---|---|---|---|---|
| PP-g-(S/MAA) (wt. %) | 29 | 29 | 26 | 26 |
| BMWPP (wt. %) | 31 | 31 | 29 | 29 |
| S-EB-S-g-MA (wt. %) | 20 | 15 | 20 | 15 |
| SEBS (wt. %) | — | — | — | 5 |
| Ethylene-octene rubber (wt. %) | — | 5 | — | — |
| Polyamide (wt. %) | 20 | 20 | 25 | 25 |
| Antioxidant (pph) | 0.2 | 0.2 | 0.2 | 0.2 |
| Ca stearate (pph) | 0.1 | 0.1 | 0.1 | 0.1 |
| Notched Izod impact (ft. lb/in) | 13 | 12 | 10 | 16 |
| Tensile strength @ yield (psi) | 4500 | 4318 | 4660 | 4650 |
| Flex. modulus, 1% secant (kpsi) | 171 | 175 | 170 | 171 |
| Flex. strength @ yield (psi) | 5500 | 5357 | 5700 | 5611 |
| Elongation @ break (%) | 97 | 141 | 190 | 115 |
| Elongation @ yield (%) | 12.5 | 12.6 | 11.2 | 12.2 |

The data show that both maleated and non-maleated impact modifiers improve the impact resistance of the PP-g-(S/MAA)/polyamide blends. Tensile strength increases with increasing polyamide content.

EXAMPLE 7

This example describes the effect of water absorption on the tensile strength and modulus of blends of PP-g-(S/MAA)

EXAMPLE 8

This example describes the effect of using various additives to improve the scratch and mar resistance of a blend of a PP-g-(S/MAA) graft copolymer and a polyamide containing a BMWD PP and a rubber, with and without a maleated polypropylene as a co-compatibilizer or coupling agent.

The graft copolymer was prepared as described in Example 1. The graft copolymer was then blended with the materials listed in Table 8 as described in Example 1.

The BMWD PP, the rubber, the antioxidant, the maleated polypropylene, and the polyamide were described in Example 1.

The polyethylene wax was Polywax 3000 polyethylene, a fully saturated homopolymer having a melting point of 129° C. and a number average molecular weight ($M_n$) of 3000, and is commercially available from Baker Petrolite, Polymers Division. The polysiloxane was MB50-001 polydimethylsiloxane, commercially available from Dow Corning.

The ceramic microspheres were X-292 Zeeospheres, a silica-alumina ceramic alloy in which 90% by volume of the sample had a particle size of ≦5.0–6.2 μm, treated with Union Carbide A 1100 sizing agent.

The samples were compounded, the pellets were dried after extrusion, and injection molded test bars were molded as described in Example 1. The results of the mechanical property testing and the scratch and mar testing are given in Table 8.

a PP-g-(S/MAA) graft copolymer and a polyamide containing a BMWD PP, one or two rubber components, and a maleated polypropylene as a co-compatibilizer or coupling agent.

The graft copolymer was prepared as described in Example 1. The graft copolymer was then blended with the materials listed in Table 9 as described in Example 1.

The BMWD PP, the S-EB-S-g-MA rubber, the maleated polypropylene, the antioxidant, and the polyamide were

TABLE 8

| Sample | 1 | 2 | 3 | 4 | 5 | 6 |
|---|---|---|---|---|---|---|
| PP-g-(S/MAA) (wt. %) | 26 | 24 | 24 | 20.7 | 21 | 20 |
| BMWD PP (wt. %) | 27 | 26 | 26 | 22.3 | 23 | 22 |
| S-EB-S-g-MA (wt. %) | 22 | 22 | 22 | 22 | 22 | 22 |
| Polyamide (wt. %) | 25 | 25 | 25 | 25 | 25 | 25 |
| Maleated PP (wt. %) | — | — | — | 5 | 5 | 5 |
| Polyethylene wax (wt. %) | — | — | 3 | 3 | 3 | 3 |
| Polysiloxane (wt. %) | — | 3 | — | — | 1 | 1 |
| Ceramic microspheres (wt. %) | — | — | — | 2 | — | 2 |
| Antioxidant (pph) | 0.2 | 0.2 | 0.2 | 0.2 | 0.2 | 0.2 |
| Ca stearate (pph) | 0.1 | 0.1 | 0.1 | 0.1 | 0.1 | 0.1 |
| Notched Izod impact (ft. lb/in) | 6 | 3 | 10 | 7 | 16 | 6 |
| Tensile strength @ yield (psi) | 4925 | 4667 | 4387 | 4034 | 3854 | 3842 |
| Flexural strength @ yield (psi) | 5976 | 5856 | 5022 | 4627 | 4453 | 4418 |
| Flexural modulus (kpsi) | 150 | 168 | 151 | 139 | 134 | 135 |
| Elongation @ break (%) | 150 | 81 | 342 | 112 | 135 | 125 |
| Elongation @ yield (%) | 12 | 7.4 | 13 | 17 | 25 | 28 |
| Ford 5 finger scratch (2, 3, 4.5, 6, 7 N) | 34555 | 13345 | 23345 | 23455 | 23444 | 23345 |
| Ford 5 finger mar (2, 3, 4.5, 6, 7 N) | 34555 | 11111 | 11222 | 11111 | 11111 | 11111 |
| Ford crocking (initial gloss) | 80 | 84 | 85 | 79 | −86 | 70 |
| After marring | 4 | 20 | 6 | 32 | 55 | 28 |
| % Retention | 5 | 24 | 7 | 41 | 64 | 39 |
| Chrysler crocking (initial gloss) | 80 | 84 | 85 | 78 | 84 | 71 |
| After marring | 2 | 1 | 4 | 55 | 7 | 47 |
| % Retention | 2 | 1 | 5 | 71 | 8 | 66 |

All of the blends containing a polyethylene wax; a polysiloxane; a combination of a polyethylene wax and ceramic microspheres; or a combination of a polyethylene wax, a polysiloxane, and ceramic microspheres exhibited significantly better scratch and mar resistance and overall mechanical properties than the composition without a scratch/mar additive.

EXAMPLE 9

This example describes the effect of using various additives to improve the scratch and mar resistance of a blend of described in Example 1. The ethylene-octene rubber was Engage 8150 polyolefin elastomer containing 25% octene, commercially available from DuPont-Dow Elastomers. The polyethylene wax, the polysiloxane, and the ceramic microspheres were described in Example 8.

The samples were compounded, the pellets were dried after extrusion, and injection molded test bars were molded as described in Example 1. The results of the mechanical property testing and the scratch and mar testing are given in Table 9.

TABLE 9

| Sample | 1 | 2 | 3 | 4 | 5 | 6 | 7 | 8 |
|---|---|---|---|---|---|---|---|---|
| PP-g-(S/MAA) (wt. %) | 29 | 28.2 | 26.9 | 27.4 | 26.9 | 26.9 | 26.4 | 26.4 |
| BMWD PP (wt. %) | 31 | 30.6 | 29.1 | 29.6 | 29.1 | 29.1 | 28.6 | 28.6 |
| S-EB-S-g-MA (2% MA) (wt. %) | 10 | 10 | 10 | 10 | 10 | 10 | 10 | 6 |
| Ethylene-octene rubber (wt. %) | — | — | — | — | — | — | — | 4 |
| Polyamide (wt. %) | 25 | 25 | 25 | 25 | 25 | 25 | 25 | 25 |
| Maleated PP (wt. %) | 5 | 5 | 5 | 5 | 5 | 5 | 5 | 5 |
| Polyethylene wax (wt. %) | — | — | — | 3 | 3 | 3 | 3 | 3 |
| Polysiloxane (wt. %) | — | — | 3 | — | 1 | — | 1 | 1 |
| Ceramic microspheres (wt. %) | — | 1 | 1 | — | — | 1 | 1 | 1 |
| Antioxidant (pph) | 0.2 | 0.2 | 0.2 | 0.2 | 0.2 | 0.2 | 0.2 | 0.2 |
| Ca stearate (pph) | 0.1 | 0.1 | 0.1 | 0.1 | 0.1 | 0.1 | 0.1 | 0.1 |
| Notched Izod impact (ft. lb/in) | 2.4 | 2 | 1.8 | 1.7 | 1.7 | 2 | 1.7 | 1.5 |
| Tensile strength @ yield (psi) | 5869 | 5816 | 5295 | 5404 | 5356 | 5608 | 5159 | 5665 |
| Flexural strength @ yield (psi) | 8001 | 7822 | 7352 | 7500 | 7418 | 7476 | 7143 | 7636 |
| Flexural modulus (kpsi) | 232 | 226 | 220 | 239 | 223 | 235 | 214 | 226 |
| Elongation @ break (%) | 47 | 49 | 59 | 45 | 52 | 33 | 52 | 44 |
| Elongation @ yield (%) | 6.7 | 7.6 | 16 | 6.3 | 7.3 | 6 | 8.6 | 5 |

TABLE 9-continued

| Sample | 1 | 2 | 3 | 4 | 5 | 6 | 7 | 8 |
|---|---|---|---|---|---|---|---|---|
| Ford 5 finger scratch (2, 3, 4.5, 6, 7 N) | 23344 | 23444 | 23444 | 22334 | 22334 | 23344 | 22344 | 22334 |
| Ford 5 finger mar (2, 3, 4.5, 6, 7 N) | 22333 | 11122 | 11111 | 11112 | 11112 | 11111 | 11111 | 11111 |
| Ford crocking (initial gloss) | 87 | 81 | 80 | 86 | 86 | 83 | 81 | 81 |
| After marring | <2.0 | 27 | 22 | 12 | 6 | 18 | 9 | 23 |
| % Retention | — | 33 | 28 | 14 | 7 | 22 | 11 | 28 |
| Chrysler crocking (initial gloss) | 87 | 80 | 81 | 86 | 86 | 83 | 81 | 81 |
| After marring | <1.0 | 2 | 2 | 3 | 9 | 40 | 50 | 29 |
| % Retention | — | 3 | 3 | 4 | 10 | 48 | 62 | 36 |

All of the blends containing a polyethylene wax; a polysiloxane; a combination of a polyethylene wax and ceramic microspheres; or a combination of a polyethylene wax, a polysiloxane, and ceramic microspheres exhibited significantly better scratch and mar resistance and overall mechanical properties than the composition without a scratch/mar additive.

EXAMPLE 10

This example describes the effect of using various maleated polypropylene compatibilizers in varying amounts on the mechanical properties of a blend of a PP-g-(S/MAA) graft copolymer, a BMWD PP, a rubber, and a polyamide.

The graft copolymer was prepared as described in Example 1. The graft copolymer was then blended with the materials listed in Table 10 as described in Example 1.

The BMWD PP, the polyamide, the rubber, and the antioxidant were the same as in Example 1. Maleated PP 1 was Unite MP1000 polypropylene and was described in Example 1. Maleated PP 2 was Polybond 3200 polypropylene, commercially available from Uniroyal Chemicals. Maleated PP 3 was Epolene E-43 polypropylene, commercially available from Eastman Chemical Company. Maleated polypropylene 4 was Exxelor P01015 polypropylene, commercially available from Exxon Chemical Company.

The samples were compounded, the pellets were dried after extrusion, and injection molded test bars were molded as described in Example 1. The results of the mechanical property measurements are given in Table 10.

The addition of maleated polypropylene to a blend of PP-g-(S/MAA) graft copolymer, a BMWD PP, a rubber, and a polyamide yields a desirable balance of mechanical properties and surface properties.

EXAMPLE 11

This example describes the effect of using various amounts of glass fiber on the mechanical properties of a blend of a PP-g-(S/MAA) or PP-g-(S/MS/MA) graft copolymer, a BMWD PP, a rubber, maleated polypropylene, and a polyamide.

The PP-g-(S/MAA) graft copolymer was prepared as described in Example 1. The PP-g-(S/MS/MA) graft copolymer was prepared as described in Example 2. The graft copolymer was then blended with the materials listed in Table 11 as described in Example 1, except that the glass fiber was fed downstream from a hopper.

The BMWD PP, the polyamide, the rubber, and the antioxidant were the same as in Example 1. The glass fiber was PPG-3793 glass fiber coated with an aminosilane coupling agent and commercially available from PPG Industries. The maleated polypropylene in samples 1–5 was Unite MP1000 polypropylene, commercially available from Aristech Chemical Corporation. The maleated polypropylene used in Sample 6 was Hercoprime HG201 polypropylene, commercially available from Montell USA Inc.

The samples were compounded, the pellets were dried after extrusion, and test bars were molded as described in Example 1. The blends were extruded on a 40 mm co-rotating, intermeshing Werner-Pfleider twin screw extruder at a temperature of 250° C., a throughput rate of 150 lb/hr, and a screw speed of 450 rpm. Vacuum was

TABLE 10

| Sample | 1 | 2 | 3 | 4 | 5 | 6 | 7 | 8 |
|---|---|---|---|---|---|---|---|---|
| PP-g-(S/MAA) | 31.4 | 31.4 | 31.4 | 29 | 29 | 29 | 30 | 30 |
| BMWD PP | 33.6 | 33.6 | 33.6 | 31 | 31 | 31 | 32.5 | 32.5 |
| S-EB-S-g-MA (2% MA) | 10 | 10 | 10 | 10 | 10 | 10 | 10 | 10 |
| Polyamide | 20 | 20 | 20 | 25 | 25 | 25 | 25 | 25 |
| Maleated PP 1 | 5 | — | — | — | 5 | — | 2.5 | — |
| Maleated PP 2 | — | — | 5 | 5 | — | — | — | — |
| Maleated PP 3 | — | — | — | — | — | — | — | 2.5 |
| Maleated PP 4 | — | 5 | — | — | — | 5 | — | — |
| Antioxidant (pph) | 0.2 | 0.2 | 0.2 | 0.2 | 0.2 | 0.2 | 0.2 | 0.2 |
| Ca stearate (pph) | 0.1 | 0.1 | 0.1 | 0.1 | 0.1 | 0.1 | 0.1 | 0.1 |
| Notched Izod impact (ft. lb/in) | 1.62 | 1.71 | 1.54 | 1.73 | 2.4 | 2.1 | 1.6 | 1.2 |
| Tensile strength @ yield (psi) | 5878 | 6051 | 6083 | 5900 | 5869 | 5820 | 6044 | 6487 |
| Flexural strength @ yield (psi) | 7482 | 7480 | 7584 | 7602 | 8001 | 7518 | 7864 | 8705 |
| Flexural modulus (kpsi) | 223 | 214 | 222 | 225 | 232 | 219 | 230 | 252 |
| Elongation @ break (%) | 61 | 55 | 58.2 | 40 | 47 | 41 | 35 | 20 |
| Elongation @ yield (%) | 7.1 | 8.2 | 7.6 | 7 | 6.7 | 7.5 | 6 | 5 | applied to remove by-products such as water or residual monomer. The results of the mechanical property measurements are given in Table 11.

TABLE 11

| Sample | 1 | 2 | 3 | 4 | 5 | 6 |
|---|---|---|---|---|---|---|
| PP-g-(S/MAA) (wt. %) | 21.5 | 16.8 | 12 | 9.5 | 16.8 | — |
| PP-g-(S/MS/MA) (wt. %) | — | — | — | — | — | 14 |
| BMWD PP (wt. %) | 23.5 | 18.2 | 13 | 10.5 | 18.2 | 14.6 |
| S-EB-S-g-MA (wt. %) | 15 | 15 | 15 | 20 | 5 | 15 |
| Polyamide (wt. %) | 25 | 25 | 25 | 25 | 25 | 25 |
| Glass fiber (wt. %) | 10 | 20 | 30 | 30 | 30 | 30 |
| Maleated PP (wt. %) | 5 | 5 | 5 | 5 | 5 | 1.4 |
| Antioxidant (pph) | 0.2 | 0.2 | 0.2 | 0.2 | 0.2 | 0.2 |
| Calcium stearate (pph) | 0.1 | 0.1 | 0.1 | 0.1 | 0.1 | 0.1 |
| Notched Izod impact (ft. lb/in) | 1.54 | 2 | 2.54 | 4.1 | 1.1 | 2.2 |
| Tensile strength @ yield (psi) | 7169 | 9212 | 10620 | 8757 | 11630 | 12500 |
| Flexural strength @ yield (psi) | 9006 | 10800 | 12310 | 9926 | 13010 | 15680 |
| Flexural modulus (kpsi) | 309 | 465 | 608 | 464 | 856 | 639 |
| Elongation @ break (%) | 4.1 | 3.6 | 3.4 | 4.5 | 2 | 4.6 |
| Elongation @ yield (%) | 4 | 3.5 | 3.4 | 4.2 | 2 | 4.6 |
| HDT @ 66 psi (° C.) | 129 | 138 | 141 | 123 | 157 | 150 |

The data show that the addition of glass fiber to the graft copolymer blends gives outstanding strength, stiffness, and HDT, but also reduces the elongation to break.

EXAMPLE 12

This example described the effect of using various fillers on the mechanical properties of a blend of a PP-g-(S/MAA) graft copolymer, a BMWD PP, a rubber, and a polyamide.

The graft copolymer was prepared as described in Example 1. The graft copolymer was then blended with the materials listed in Table 12 as described in Example 1.

The BMWD PP, the polyamide, and the rubber were the same as described in Example 1.

The samples were compounded on a 34 mm co-rotating, intermeshing Leistritz twin screw extruder at a melt temperature of 245° C., a screw speed of 300 rpm, and a throughput rate of 25 lb/hr. Injection molded test bars were molded as described in Example 1. The results of the mechanical property measurements are given in Table 12.

TABLE 12

| Sample | 1 | 2 | 3 |
|---|---|---|---|
| PP-g-(S/MAA) (wt. %) | 17 | 17 | 17 |
| BMWD PP (wt. %) | 18 | 18 | 18 |
| S-EB-S-g-MA (wt. %) | 15 | 15 | 15 |
| Polyamide (wt. %) | 20 | 20 | 20 |
| Wollastonite (wt. %) | 30 | — | — |
| Talc (wt. %) | — | 30 | — |
| Calcium carbonate (wt. %) | — | — | 30 |
| Notched Izod impact (ft. lb/in) | 1.1 | 1.7 | 2 |
| Tenslle strength @ yield (psi) | 6349 | 5819 | 5116 |
| Flexural strength @ yield (psi) | 8612 | 7856 | 6549 |
| Flexural modulus (kpsi) | 316 | 287 | 193 |
| Elongation @ break (%) | 28 | 41 | 69 |
| Elongation @ yield (%) | 15 | 18 | 20 |

The data show that the addition of a filler improves the strength and stiffness of the blends.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

We claim:
1. A composition comprising by weight, based on the total weight of the composition:
   (a) about 1% to about 98% of a graft copolymer comprising a backbone of a propylene polymer material having graft polymerized thereto monomers selected from the group consisting of (i) at least one vinyl aromatic compound and an unsaturated carboxylic acid and (ii) at least one vinyl aromatic compound and an anhydride of an unsaturated carboxylic acid, wherein the polymerized monomers are present in an amount from about 10 to about 95 parts per hundred parts of the propylene polymer material;
   (b) about 2% to about 99% of at least one polyamide resin;
   (c) about 5% to about 90% of a broad molecular weight distribution propylene polymer material having a weight average molecular weight to number average molecular weight ratio of about 5 to about 60;
   (d) optionally, about 2% to about 30% of at least one rubber component selected from the group consisting of (i) an olefin copolymer rubber, (ii) a monoalkenyl aromatic hydrocarbon-conjugated diene block copolymer, and (iii) a core-shell rubber;
   (e) optionally, an additive to improve the scratch and mar resistance of the composition selected from the group consisting of (a) about 0.5% to about 10% of at least one low molecular weight ethylene polymer of a functionalized derivative thereof, having a number average molecular weight of about 300 to about 5000, and (b) a combination of about 0.5% to about 10% of at least one of the low molecular weight ethylene polymers in (a) and about 0.5% to about 10% of inorganic microspheres.

2. The composition of claim 1 which additionally comprises a polysiloxane.

3. An article of manufacture made from the composition of claim 1.

4. The composition of claim 1 wherein the propylene polymer material is selected from the group consisting of:
   (a) a homopolymer of propylene having an isotactic index greater than 80;
   (b) a copolymer of propylene and an olefin selected from the group consisting of ethylene and 4–10 C alpha-olefins, provided that when the olefin is ethylene, the maximum polymerized ethylene content is about 10% and when the olefin is a 4–10 C alpha-olefin, the maximum polymerized content thereof is about 20% by weight, the copolymer having an isotactic index greater than 85;

(c) a terpolymer of propylene and two olefins selected from the group consisting of ethylene and 4–8 C alpha-olefins, provided that the maximum polymerized 4–8 C alpha-olefin content is 20% by weight, and, when ethylene is one of the olefins, the maximum polymerized ethylene content is 5% by weight, the terpolymer having an isotactic index greater than 85;

(d) an olefin polymer composition comprising:
  (i) about 10% to about 60% by weight of a propylene homopolymer having an isotactic index greater than 80, or a copolymer of monomers selected from the group consisting of (1) propylene and ethylene, (2) propylene, ethylene and a 4–8 C alpha-olefin, and (3) propylene and a 4–8 C alpha-olefin, the copolymer having a polymerized propylene content of more than 85% by weight and an isotactic index greater than 85;
  (ii) about 5% to about 25% by weight of a copolymer of ethylene and propylene or a 4–8 C alpha-olefin that is insoluble in xylene at ambient temperature; and
  (iii) about 30% to about 70% by weight of an elastomeric copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% by weight of a polymerized diene and containing less than 70% by weight of polymerized ethylene and being soluble in xylene at ambient temperature and having an intrinsic viscosity, measured in tetrahydronaphthalene at 135° C., of about 1.5 to about 4.0 dl/g, wherein the total amount of (ii) and (iii), based on the total olefin polymer composition, is about 50% to about 90%, the weight ratio of (ii)/(iii) is less than 0.4, and the composition is prepared by polymerization in at least two stages and has a flexural modulus of less than 150 MPa; and (e) a thermoplastic olefin comprising:
  (i) about 10% to about 60% of a propylene homopolymer having an isotactic index greater than 80, or a copolymer of monomers selected from the group consisting of (1) ethylene and propylene, (2) ethylene, propylene and a 4–8 C alpha-olefin, and (3) ethylene and a 4–8 C alpha-olefin, the copolymer having a polymerized propylene content greater than 85% and an isotactic index of greater than 85;
  (ii) about 20% to about 60% of an amorphous copolymer of monomers selected from the group consisting of (1) ethylene and propylene, (2) ethylene, propylene, and a 4–8 C alpha-olefin, and (3) ethylene and a 4–8 C alpha-olefin, the copolymer optionally containing about 0.5% to about 10% of a polymerized diene, and containing less than 70% polymerized ethylene and being soluble in xylene at ambient temperature; and
  (iii) about 3% to about 40% of a copolymer of ethylene and propylene or a 4–8 C alpha-olefin that is insoluble in xylene at ambient temperature, wherein the composition has a flexural modulus of greater than 150 but less than 1200 MPa.

5. The composition of claim 4 wherein the propylene polymer material is propylene homopolymer.

6. The composition of claim 1 wherein the amount of the graft copolymer is about 50% to about 90%.

7. The composition of claim 1 wherein the polymerized monomers are styrene and methacrylic acid.

8. The composition of claim 7 wherein the molar ratio of styrene to methacrylic acid is 60/40.

9. The composition of claim 1 wherein the polyamide is polycaprolactum.

* * * * *